Feb. 10, 1942.    R. S. TAYLOR ET AL    2,272,892
METHOD OF VULCANIZING TIRES
Filed May 19, 1939    2 Sheets-Sheet 1

INVENTOR
RAYMOND S. TAYLOR
GEORGE P. BOSOMWORTH
BY
Ely & Frye
ATTORNEYS

Feb. 10, 1942.   R. S. TAYLOR ET AL   2,272,892
METHOD OF VULCANIZING TIRES
Filed May 19, 1939   2 Sheets-Sheet 2

INVENTORS
RAYMOND S. TAYLOR
GEORGE P. BOSOMWORTH
BY
ATTORNEYS

Patented Feb. 10, 1942

2,272,892

UNITED STATES PATENT OFFICE 2,272,892

METHOD OF VULCANIZING TIRES

Raymond S. Taylor and George P. Bosomworth, Akron, Ohio, assignors to The Firestone Tire & Rubber Company, Akron, Ohio, a corporation of Ohio Application May 19, 1939, Serial No. 274,550

6 Claims. (Cl. 18—53)

This invention relates to the vulcanizing of rubber tires, and more especially it relates to the vulcanizing of pneumatic tire casings and other similar expansible and inflatable rubber articles.

Pneumatic tire casings usually comprise a carcass of rubberized weftless or weak-wefted cord fabric, inextensible beads at the edges thereof, and tread and sidewalls of rubber composition of suitable or desirable physical characteristics. The tire is vulcanized in a confining mold that imparts final shape to the tire, the mold being mounted in a pot heater, or being steam-jacketed and mounted in a vulcanizer of the "watch-case" type. During vulcanization, the tire usually is provided with an expansible core through the agency of which a distending internal pressure is applied to the tire to stretch the carcass fabric thereof, and to force the rubber tread and side wall portions of the tire into conformity with the configuration of the mold cavity in which the tire is mounted. During vulcanization, the mold, if in a pot heater, has its exterior exposed to steam to supply vulcanizing heat. If the mold is of the steam-jacket type, the steam is introduced into the chambered jacket of the mold. Heat applied to the tire in the manner described is not uniformly distributed to the tire, said heat being greatest at the outer surface of the tire. For this reason it is customary to introduce a heated fluid into the expansible core so as concurrently to heat the tire from the interior thereof, said fluid being under pressure to effect distension of the expansible core for the purpose previously mentioned.

To effect expansion of the core as described, various fluids and combinations of fluids heretofore have been used. For example, air or other gaseous fluid, such as carbon dioxide, has been used to effect expansion of the core, but this has not been satisfactory due to difficulty in heating the air or gas. Furthermore, the expense of heat exchangers or gas producers, together with associated compressors, has resulted in excessive vulcanizing cost whenever these vulcanizing media are employed, either by themselves or in combination with other fluids. Oxidation of the expansible core arising from the use of air therein, and the difficulty in detecting leaks in air or gas lines also are factors that make the use of these media unsatisfactory. Another vulcanizing practice is the use of hot water within the expansible core. This practice is not entirely satisfactory for the reason that it does not produce uniform heating of the tire, it is not possible to obtain the high temperatures required, and it constitutes a dangerous hazard for the operators attending the vulcanizers. Furthermore, the use of water as a vulcanizing medium slows down the speed of operation, as compared to the use of gaseous fluids, due to the longer time required for charging the expansible core, and for removing the water therefrom when vulcanization is completed and before the mold is opened.

Another vulcanizing method has been proposed wherein steam is admitted to the expansible core during the initial interval of vulcanization, after which the steam is replaced by air at a higher pressure than the steam. This method has been found not entirely satisfactory due to the necessity for maintaining the relatively high pressure to the end of the cure. The method also is subject to the unsatisfactory features previously enumerated that are present whenever air or gas under pressure is present. Unless the steam and air are thoroughly intermixed there is likely to be non-uniformity of heat distribution. Lastly, the steam in the core is not recoverable.

The chief object of the present invention is to overcome or avoid the aforementioned disadvantages inherent in prior tire-vulcanizing practice. More specifically, the invention aims to provide a vulcanizing method that may be practiced with less equipment than prior methods; to provide a method of the character mentioned that is less hazardous to practice; to produce a vulcanized rubber product of superior quality as the result of uniformity of vulcanizing heat employed; to provide a method capable of more rapid operation due to shorter time required for effecting the expansion of a core, and a shorter time required for the blowing down of the same at the termination of the vulcanizing interval; to provide a vulcanizing method wherein a part, at least, of the vulcanizing medium is recoverable; to shorten the time required for effecting vulcanization; to provide a method that permits the use of a lighter and cheaper mold; and in general, to effect a saving of time and money in the vulcanization of tire casings and similar expansible rubber products. Other objects will be manifest as the description proceeds.

Of the accompanying drawings—

Figure 1:
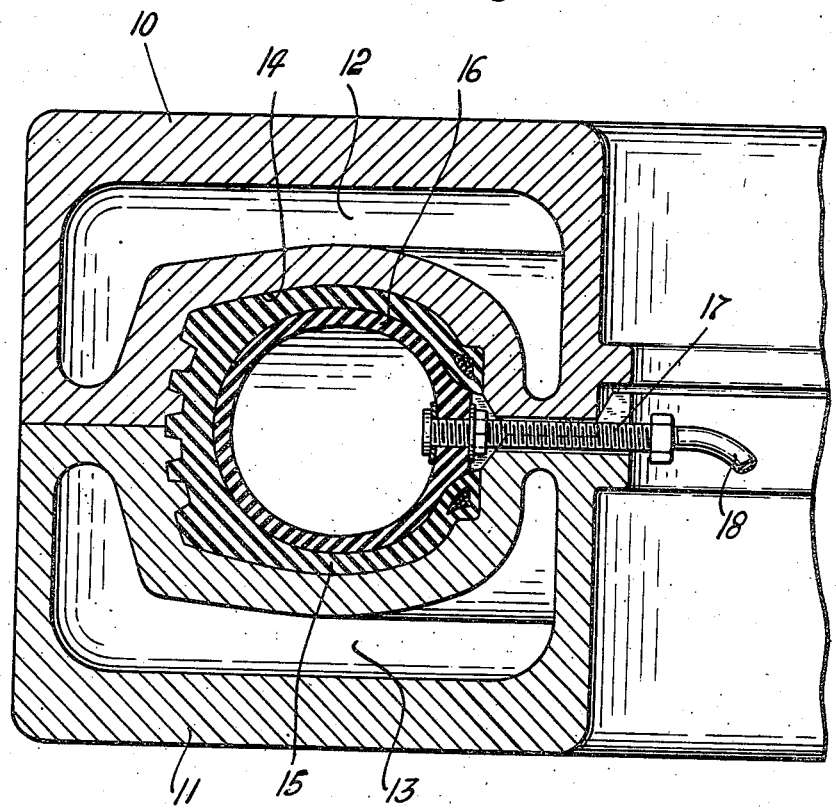
Figure 1 is a fragmentary transverse section through a tire mold and expansible core such as may be employed in carrying out the improved method, and a pneumatic tire casing in said mold and enclosing said core.
Figure 2:
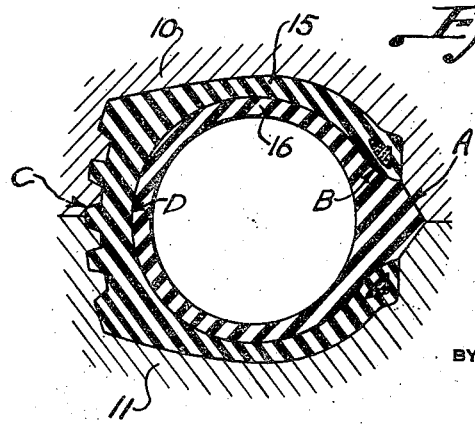
Figure 2 is a somewhat diagrammatic section of the tire casing, expansible core, and mold showing the points at which temperature readings are taken.

Referring to Figure 1 of the drawings, there is shown a vulcanizing mold comprising mating mold sections 10, 11. The mold illustrated is of the steam-jacket type, the sections thereof being formed interiorly with steam chambers 12, 13 respectively that have suitable connection (not shown) with a suitable source of steam supply whereby the mold sections are heated by the circulation of steam therethrough. Molds of the type described are usually mounted in watchcase vulcanizers, but it will be understood that molds without steam jackets may be employed, and heated in a pot heater as is well understood in the art. The mold sections 10, 11 together define the usual annular, tire-molding cavity 14 in which a pneumatic tire casing 15 is receivable. Mounted within the tire casing 15 is a hollow expansible core 16, which core usually is constructed of rubber, and which has walls of uniform thickness throughout except for a relatively narrow, circumferential region of greater thickness at its inner circumference. Expansion of the core 16 is effected by a fluent medium that is introduced to the interior thereof through a tubular inflation stem 17, which stem extends radially through the mold at the inner circumference thereof, and is connected to a pipe 18 that communicates with a suitable source of supply (not shown) of the said fluent medium.

Although the mold shown and described is adapted solely for the vulcanization of pneumatic tire casings, and the improved method will be described with relation to the vulcanization of tire casings, it will be undertood that the method may also be employed for the vulcanization of other similar inflatable articles, and that apparatus other than that illustrated herein may be employed if desired.

In the practice of the improved method there are certain factors of time, temperature, and pressure, that will vary accodring to the size or mass of the article being vulcanized, and to some extent according to the limitations and types of equipment. The specific figures hereinafter set forth have been found to produce satisfactory results in the vulcanizing of a 6.50—16 four-ply passenger type tire casing in the jacket mold shown in the drawings. The use of a jacket type mold is preferable to a mold that is mounted in a pot heater for the reason that the jacket type mold does not require to be cooled between successive vulvanizing operations.

The practice of the improved method with the apparatus shown is as follows. Steam pressure is maintained in the chambers 12, 13 of the mold at 304° F. at all times. After the tire 15 with expansible core 16 therein is mounted in the mold and the mold closed, steam is supplied to said expansible core through the inflation stem 17, said steam having a temperature of approximately 387° F. (200 pounds of pressure). This temperature and pressure is maintained within the core for a period of 15 minutes, after which the pressure is reduced for the remainder of the cure, the total curing time being approximately 35 minutes. At the end of the vulcanizing operation the internal steam pressure may be as low as 100 pounds, which pressure however is greater than the steam pressure in chambers 12, 13 and is sufficient to maintain the tire in contact with the mold, so that there is no separation of the tire and mold. The reduction of the internal steam pressure may be effected either by reducing it under control, or simply by shutting off the steam supply entirely and permitting the pressure to fall as the heat of the steam is given up to the tire being vulcanized, the latter procedure being preferred. It will be understood that the time, temperature, and pressures given are for a particular tire, and are subject to variation when the method is used in vulcanizing other types of tires.

Figure 3:
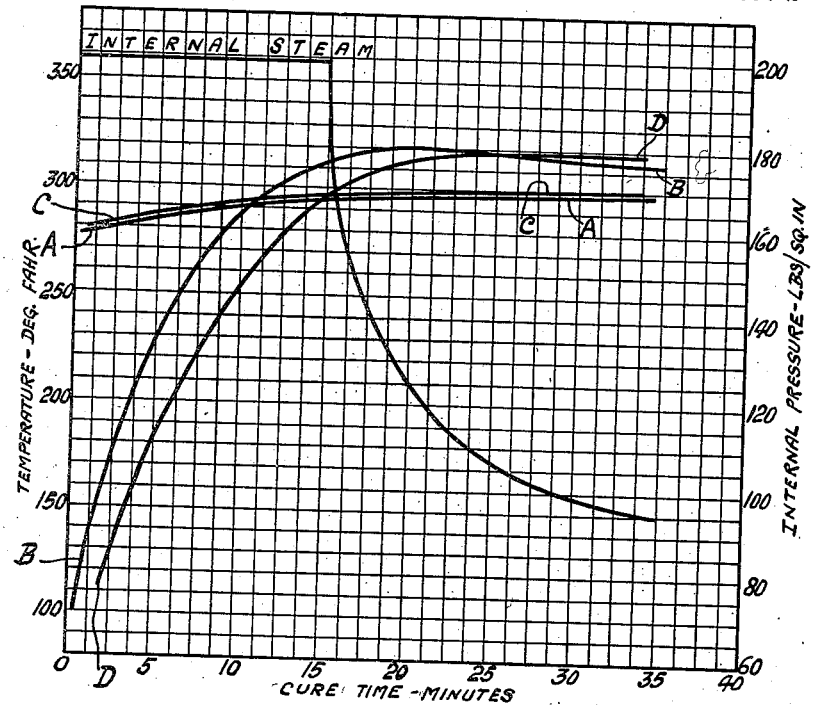
Figure 3 is a graph showing the temperature readings at the points indicated in Fig. 2 during vulcanization of a tire according to one method of the invention.

When the tire 15 is mounted in the hot mold, the rubber composition of the tread and sidewalls of the tire quickly starts to soften. Thus the high pressure steam admitted to the expansible core is enabled to distend the latter and the adjacent carcass plies of the tire, and thereby readily to force the soft, flowable tread and sidewall rubber of the tire into the recesses and grooves of the mold cavity. Due to the heavy wall of the expansible core 16, there is a substantial lag between the time steam is admitted to the core and the time the heat from the latter reaches the tire structure. Thus at the time the internal steam pressure is shut off, after 15 minutes of the vulvanizing interval, the temperature at the inner surface of the tire is still substantially below the temperature at the outside surface thereof. Eventually after approximately 22 minutes of the vulcanizing time have elapsed, the temperature on the inner surface of the tire will equal that on the outer surface thereof, and at the end of the cure may exceed the temperature on the outer surface by 14° more, or less, but this slight differential is of small consequence and will not result in an overcure of the inside of the tire. The foregoing data are graphically illustrated in Figure 3 of the drawings.

From the foregoing it will be seen that the expansive property of steam is utilized to effect a gradual reduction of the internal pressure during vulcanization of a tire. The arrangement reduces the amount of condensate within the expansible cores, such as occurs when air or gas is mixed with the steam in the core, and enables steam from the cores to be recovered and reused at lower pressure when the cores are evacuated or blown down at the end of a vulcanizing operation. The time required for blowing down the core is substantially less than is the case where water is used as a core-expanding medium, and a superior tire is produced by reason of the uniformity of heating provided by the internal steam. The method results in a decrease in molding defects in the tires, and achieves the other advantages set out in the foregoing statement of objects.

Figure 4:
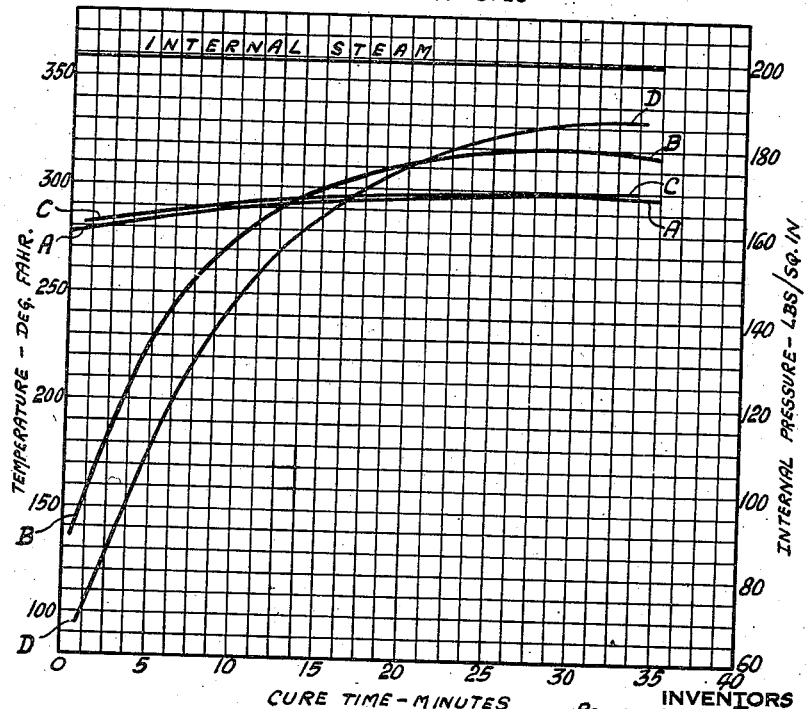
Figure 4 is a similar graph showing temperature reading during vulcanization of a tire according to a modified method of the invention.

In the vulcanizing of relatively large tires, that is, tires having 8 or 10 fabric carcass plies, the foregoing method is modified so that sufficient heat is applied to the interior of the tire to penetrate all the plies of the latter, and to effect adequate vulcanization of the rubber that bonds the thread of the tire to the carcass. Said modification consists in maintaining the steam in the expansible core at its initial pressure throughout the entire vulcanizing interval. Said pressure may be the same as used in the previously described method (200 pounds), or it may be higher. However, due to the time lag of the heat in passing through the expansible core, and due to the thickenss of the carcass plies, the temperature of the interior of the tire will continue to increase during the entire vulcanizing interval, although it never attains the full temperature of the steam in the expansible core. Data relating to temperatures that obtain during practice of the modified method of the invention are graphically illustrated in Figure 4 of the drawings.

The modified procedure achieves the several advantages inherent in the first-described method, and it shortens the time required for effecting the vulcanization of the larger size tires.

Other modification may be resorted to without departing from the spirit of the invention, or the scope thereof as defined by the appended claims.

What is claimed is:

1. The method of vulcanizing inflatable articles which comprises subjecting the exterior of the article to substantially uniform heat throughout the vulcanizing interval, subjecting the article to constantly increasing temperature applied at a uniform rate to the interior thereof throughout the vulcanizing interval, and subjecting all parts of the article to pressure as it is so heated, said pressure being greatest at the beginning of the vulcanizing interval.

2. The method of vulcanizing inflatable articles which comprises subjecting the exterior of the article to substantially uniform heat throughout the vulcanizing interval, subjecting the article to constantly increasing temperature applied at a uniform rate to the interior thereof throughout the vulcanizing interval, and subjecting all parts of the article to pressure as it is so heated, said pressure being relatively high for a determinate period at the beginning of the vulcanizing interval, and thereafter progressively decreasing at a uniform rate.

3. The method of vulcanizing inflatable articles in molds which comprises heating the article with steam from the interior and exterior thereof throughout the vulcanizing interval, and subjecting the article to internal pressure while so heated, the internal pressure being relatively high for a determinate interval at the beginning of the vulcanizing interval and thereafter progressively decreasing at a uniform rate.

4. The method of vulcanizing pneumatic tire casings, which comprises confining a tire, with an inflatable expansible core therein, within a heated mold, admitting steam under high pressure to the expansible core for a determinate time interval, and then shutting off the supply of steam for the remainder of the cure but retaining the steam in the core for the duration of the vulcanizing period, whereby the pressure of the steam decreases as the heat thereof is transferred through the core into the tire.

5. The method of vulcanizing pneumatic tire casings which comprises confining a tire, with an inflatable expansible core therein, within a heated mold, admitting steam under pressure to the said core for a limited period of time short of the time required for vulcanization, retaining all the steam in the core for the entire vulcanizing period and utilizing the expansive property of the steam for effecting a progressive reduction of the pressure in the core as the heat of the steam is progressively transferred to the tire.

6. The method of vulcanizing pneumatic tire casings which comprises confining a tire with an inflatable expansible core therein within a heated mold, admitting steam under pressure to said core, and so controlling said steam as to effect a progressively increasing heating of the interior of the tire at a uniform rate while the pressure within the tire is progressively reduced at a uniform rate.

RAYMOND S. TAYLOR.
GEORGE P. BOSOMWORTH.